United States Patent
Du et al.

(10) Patent No.: US 8,878,976 B2
(45) Date of Patent: Nov. 4, 2014

(54) IMAGE CAPTURE SYSTEMS WITH FOCUSING CAPABILITIES

(75) Inventors: Zheng Du, San Jose, CA (US); Denis Chu, Fremont, CA (US); Ju Gao, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 669 days.

(21) Appl. No.: 13/155,995

(22) Filed: Jun. 8, 2011

(65) Prior Publication Data

US 2012/0315952 A1     Dec. 13, 2012

(51) Int. Cl.
| | |
|---|---|
| H04N 5/225 | (2006.01) |
| H04N 5/232 | (2006.01) |
| G03B 3/00 | (2006.01) |
| G03B 3/04 | (2006.01) |

(52) U.S. Cl.
CPC ............... G03B 3/00 (2013.01); H04N 5/2254 (2013.01); H04N 5/2251 (2013.01); H04N 5/23212 (2013.01); G03B 3/04 (2013.01)
USPC ............ 348/340; 348/335; 348/345; 348/374

(58) Field of Classification Search
CPC .. H04N 5/2252; H04N 5/2253; H04N 5/2254
USPC ......... 348/335, 336, 337, 338, 339, 340, 342, 348/343, 344, 345, 357, 360, 361, 373, 374, 348/375
See application file for complete search history.

(56) References Cited

U.S. PATENT DOCUMENTS

| | | | |
|---|---|---|---|
| 7,253,963 B2 | 8/2007 | Lee et al. | |
| 7,535,649 B2 | 5/2009 | Tang | |
| 8,115,108 B2 | 2/2012 | Sakai | |
| 2005/0212947 A1 | 9/2005 | Sato et al. | |
| 2006/0146414 A1 | 7/2006 | Cho et al. | |
| 2006/0164540 A1 | 7/2006 | Kayanuma | |
| 2006/0228103 A1* | 10/2006 | Go | ................................ 396/268 |
| 2007/0216851 A1 | 9/2007 | Matsumoto | |
| 2007/0279365 A1 | 12/2007 | Kageyama | |

(Continued)

FOREIGN PATENT DOCUMENTS

| | | |
|---|---|---|
| TW | 200807702 A | 2/2008 |
| WO | WO 2006/054562 A1 | 5/2006 |

OTHER PUBLICATIONS

TW 100144457—Taiwanese Office Action and Search Report with English Translation, issued Oct. 21, 2013 (7 pages).

(Continued)

*Primary Examiner* — Twyler Haskins
*Assistant Examiner* — Peter Chon
(74) *Attorney, Agent, or Firm* — Blakely Sokoloff Taylor & Zafman LLP

(57) ABSTRACT

Embodiments of the invention describe providing image focusing capabilities for a lens unit of an image capture system by disposing a solid state die over the lens unit. The solid state die may include a plurality of electrodes to receive a voltage or electric signal to generate an electric field. The refractive index of the solid state die will change in response to the generated electric field to focus the image or scene captured by the lens unit. The solid state die is mounted to a folded flexible printed circuit board in a housing or a molded housing having electrodes on its inner wall.

18 Claims, 6 Drawing Sheets

(56) References Cited

U.S. PATENT DOCUMENTS

| | | | |
|---|---|---|---|
| 2009/0059101 A1 | 3/2009 | Wang et al. | |
| 2009/0268152 A1* | 10/2009 | Chen | 349/200 |
| 2010/0039532 A1 | 2/2010 | Galstian et al. | |
| 2012/0120298 A1* | 5/2012 | Chiu et al. | 348/335 |
| 2012/0140101 A1* | 6/2012 | Afshari et al. | 348/308 |
| 2014/0036084 A1* | 2/2014 | Lu | 348/148 |

OTHER PUBLICATIONS

U.S. Appl. No. 13/156,014—Non-Final Office Action, mailed Mar. 14, 2014, 13 pages.

CN 2011-10460499.0—First Chinese Office Action and Search Report with English Translation, issued Jun. 27, 2014, 8 pages.

* cited by examiner

SOLID STATE DIE

IMAGE CAPTURE SYSTEMS WITH FOCUSING CAPABILITIES

FIELD

Embodiments of the invention generally pertain to image capture systems, and more particularly, but not exclusively, to enhancing or providing focusing capabilities for image capture systems.

BACKGROUND

An image capture unit such as a camera module includes an image sensor and an imaging lens. The imaging lens focuses light onto the image sensor to form an image, and the image sensor converts the light into electric signals. The electric signals are output from the image capture unit to other units in a host electronic system. The electronic system may be a mobile phone, a computer, a digital camera or a medical device.

As use of image capture units in electronic systems increases, so do the demands for image capture features, capabilities and device efficiency. For example, users may expect image capture units to have focusing capabilities (e.g., auto-focus) while having a reduced dimension or footprint and a low cost of manufacture.

Thus, there is a need for manufacturing an image capture system having advanced functions, such as auto-focus, characterized by high reliability and low cost.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe enhancing or providing image focusing capabilities for a lens unit of an image capture system by disposing a solid state die over the lens unit. The solid state die may include a plurality of electrodes to receive a voltage or electric signal to generate an electric field. The refractive index of the solid state die will change in response to the generated electric field to focus the image or scene captured by the lens unit.

Embodiments of the invention may therefore be used to enhance or provide focusing capabilities for image capture units designed with limited or no focusing capabilities (e.g., a camera module having a fixed focal length lens in a fixed position). Thus, embodiments of the invention may provide a potentially low-cost focusing solution having a reduced dimension.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
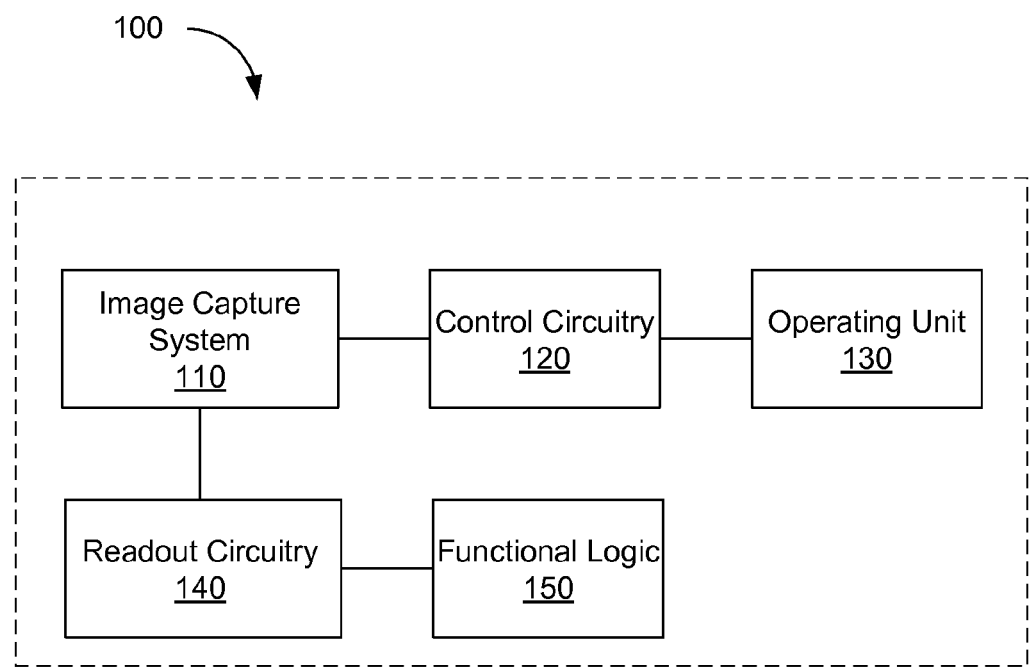
FIG. 1 is a block diagram of an electronic system in accordance with an embodiment of the disclosure.

FIG. 1 is a block diagram of an electronic system in accordance with an embodiment of the disclosure. Electronic system 100 may be, for example, a mobile phone, a computer, a digital camera or a medical device. Electronic system 100 as illustrated includes image capture system 110. Said image capture system may be any system utilizing a solid state die as a focusing mechanism similar to the example embodiments of the invention described below.

Image capture system 110 may include a lens unit and an image sensor unit. Said image sensor system may include, for example, a two-dimensional (2D) array of imaging pixels. Each imaging pixel may be arranged into a row and a column to acquire image data of a person, place, or object, which may then be used to render a 2D image of the person, place, or object.

Image data captured by image capture system 110 may be read out by readout circuitry 140. Said readout circuitry may include amplification circuitry, analog-to-digital conversion ("ADC") circuitry, or otherwise. The image data may be stored or further manipulated by functional logic 150 to apply post image effects (e.g., crop, rotate, remove red eye, adjust brightness, adjust contrast, or otherwise).

Control circuitry 120 may control the operation of image capture system 110. For example, control circuitry may generate a shutter signal for controlling image acquisition. Control circuitry 120 may further receive image information (e.g., electric signals) and command image capture system 110 to change the focal length of its solid state die to get an in-focus image similar to the example embodiments of the invention described below.

Operating unit 130 may comprise a computing or processing unit related to electronic system 100. For example, electronic system 100 may be a mobile phone, and operating unit 130 may be a telephone unit that is responsible for telephone operation of the system.

Figure 2A:
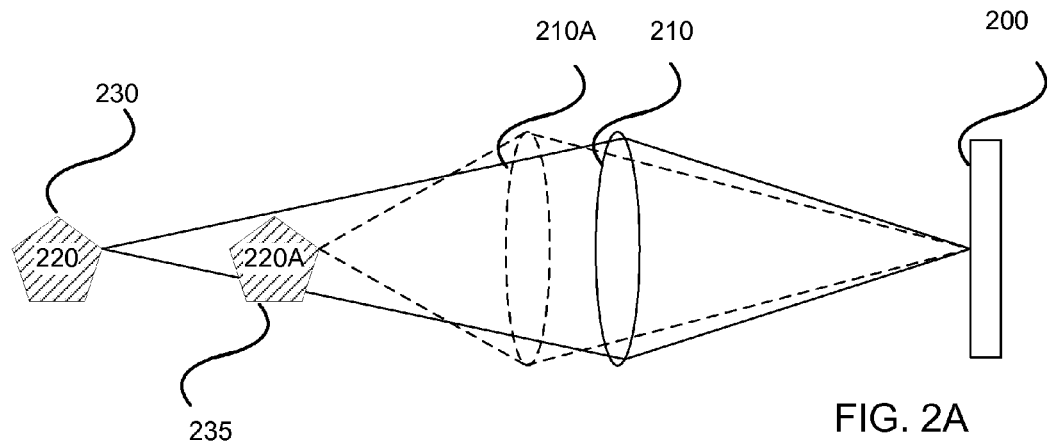
FIG. 2A and FIG. 2B are illustrations of focus mechanisms to correct an out-of-focus image to an in-focus image in accordance with embodiments of the disclosure.
Figure 2B:
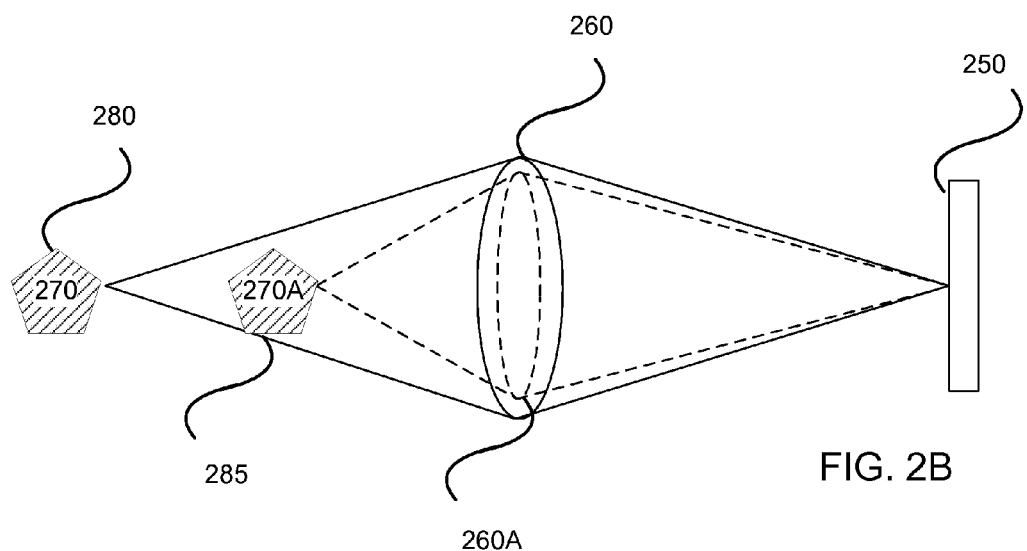

FIG. 2A and FIG. 2B are illustrations of focus mechanisms to correct an out-of-focus image to an in-focus image in accordance with an embodiment of the disclosure. It is understood that in-focus images are formed on image sensors, such as image sensor 200 (alternatively referred to herein as an "image plane") of FIG. 2A, when the distance of an object to lens 210 (i.e., object distance 'o'), the distance of image sensor 200 to lens 210 (i.e., image distance 'i'), and the focal length of lens 210 ('f') satisfy the equation:

$$1/o + 1/i = 1/f.$$

FIG. 2A illustrates lens 210 forming an in-focus image of object 220 on image sensor 200 when the object is at position 230. When object 220 is moved to a position 235 (shown as object 220A), an out-of-focus image is formed on image sensor 200 by lens 210 (i.e., the above described equation is no longer satisfied due to the changes in the value '1/o'). Accordingly, the image formed on image sensor is not in-focus (i.e., blurred). In this example focus mechanism, to correct the out-of-focus image on image sensor 200, lens 210 is moved to a new position (illustrated as lens 210A). This new position will form an in-focus or sharp image of object 220A at position 235 on image sensor 200 by altering the values '1/o' and '1/i' to satisfy the above equation.

FIG. 2B is another illustration of a focus mechanism to correct an out-of-focus image to an in-focus image. Lens 260 forms an image of object 270 at position 280 on image sensor 250. When object 270 is moved to position 285 (shown as object 270A), an out-of-focus image is formed on image sensor 250 via lens 260. In this example, to correct the out-of-focus image on image sensor 250, the focal length of lens 260 is changed to a new focal length (shown as lens 260A). This new focal length for lens 260A will form an in-focus or sharp image of object 270A at position 285 on image sensor 250 by altering the value '1/f' to satisfy the above equation.

It is to be understood that while image capture systems may include lens units with the focusing capabilities illustrated in FIG. 2A or FIG. 2B, some image capture units such as camera modules will include a fixed focal length, fixed position lens and thus will have no focusing capabilities.

Figure 3:
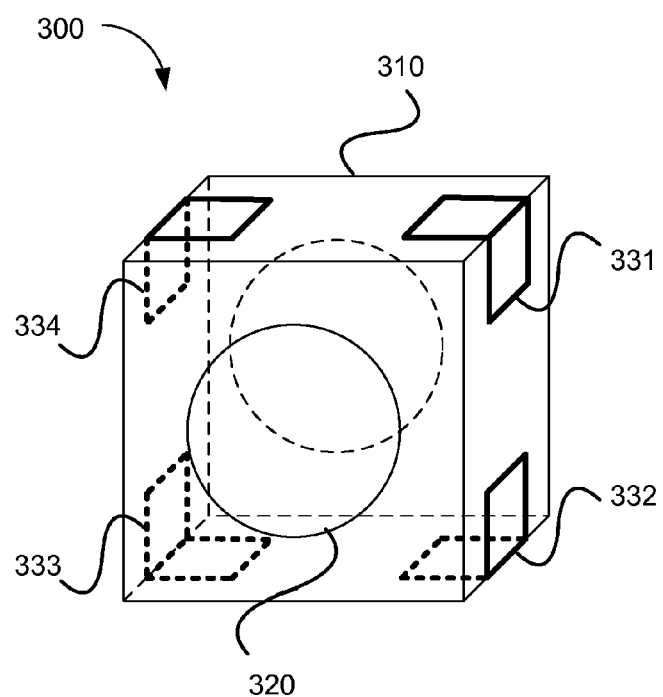
FIG. 3 is a block diagram of a solid state die to enhance or provide focusing capabilities for image capture units in accordance with an embodiment of the disclosure.

FIG. 3 illustrates an example of solid state die to enhance or provide focusing capabilities for image capture systems in accordance with an embodiment of the disclosure. Solid state die 300 is capable of changing its focal length, as described above and illustrated in FIG. 2B. Thus, solid state die 300 may be employed in combination with a lens unit of an image capture system to form an in-focus image. Solid state die 300 alone may also act as an optical lens capable of forming an image.

It is to be understood that an image capture system combining solid state die 300 with an image capture unit that includes a fixed position lens having a fixed focal length—i.e., without focusing capabilities, enables said image capture system to have image focusing capabilities at a potentially low-cost and reduced dimension.

Solid state die 300 may be comprised of, for example, liquid crystal materials or any functionally equivalent material whose refractive index may be modified via an electric field. Under an applied electric field, the refractive index of solid state die 300 is modulated locally. Applying different electric fields will cause solid state die 300 to have different focal lengths.

In this embodiment, solid state die 300 is enclosed by housing 310. Solid state die 300 includes active area 320 to transmit light through and to focus the transmitted light on an image sensor of the image capture system (described below). In this embodiment, solid state die 300 includes electrodes 331, 332, 333 and 334 at corners of housing 310. Electrodes 331-334 are configured to electrically couple to a controlling unit, which will control the voltage or electric signal received by the electrodes, thereby affecting the modulation of the refractive index of active area 320. In one embodiment, an auto-focus controlling unit (described below) controls the voltage or electric signal received by electrodes 331-334. In other embodiments, the controlling unit controls the voltage or electric signal received by electrodes 331-334 based on non-automated focusing commands (e.g., user commands).

Figure 4:
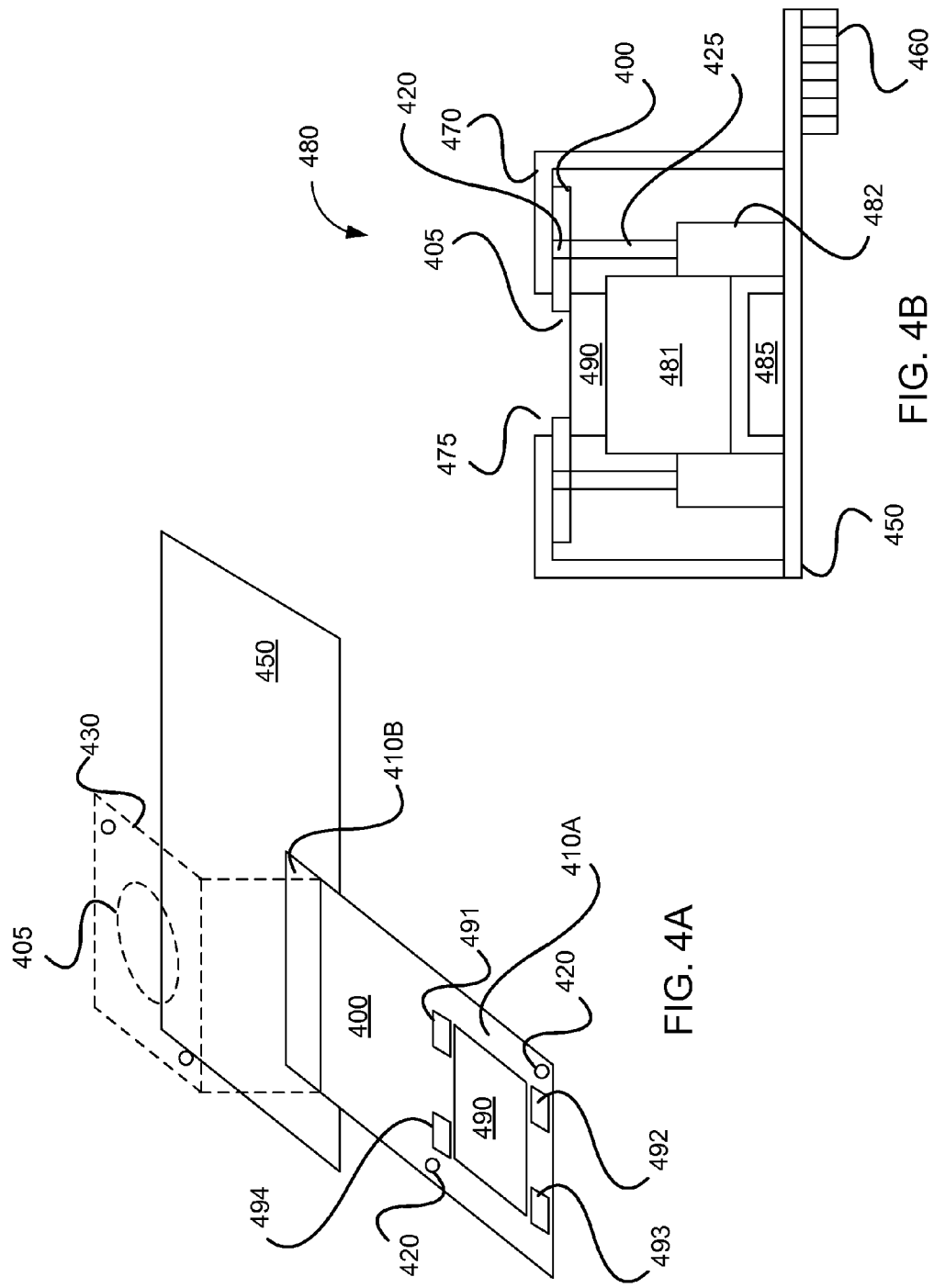
FIG. 4A and FIG. 4B are illustrations of an image capture system in accordance with an embodiment of the disclosure.

FIG. 4A and FIG. 4B are illustrations of an embodiment of an image capture system in accordance with an embodiment of the disclosure. As illustrated in FIG. 4A, a flexible printed circuit board (FPC) 400 has first end 410A and second end 410B. Second end 410B may be mounted on substrate 450 using any adhesive known in the art. In this embodiment, solid state die 490 (e.g., similar to solid state die 300 illustrated in FIG. 3) is mounted to first end 410A of FPC 400. First end 410A of FPC 400 has electrodes 491, 492, 493, and 494 conforming with electrodes of solid state die 490 (e.g., similar to electrodes 331-334 of solid state die 300 in FIG. 3).

A conductive adhesive may be provided at the electrodes of solid state die 490 to attach these electrodes to conforming electrodes 491-494 of FPC 400, such that the solid state die is electrically coupled to electric circuits on substrate 450 via the FPC. FPC 400 may also include driver circuitry for solid state die 490.

In one embodiment, an anisotropic conductive film (ACF) is used to bond FPC 400 to substrate 450. It is understood that ACF is a special adhesive film that is conductive vertically (i.e., between electrodes of FPC 400 at second end 410B and electrodes of substrate 450) but non-conductive horizontally. Therefore, it is to be understood that there will be no electric short among FPC electrodes or among any substrate electrodes in embodiments of the invention utilizing ACF.

In this embodiment, first end 410A of FPC 400 has holes 420 conforming to a set of alignment pins extended from a lens holder of an image capture unit (as shown in FIG. 4B and described below). FPC 400 may be folded into shape 430 to hold solid state die 490 in place over a lens unit using at least the set of alignment pins and corresponding holes 420.

FIG. 4B is an illustration of FPC 400 folded into shape 430 (see FIG. 4A) to position solid state die 490 on lens unit 481. In this embodiment, image capture unit 480 is operatively coupled to substrate 450. Said substrate may have electrical circuits and electrodes on one side or both sides of the substrate.

Image capture unit 480 includes lens unit 481, held by lens holder 482, and image sensor 485. Lens unit 481 may be a single lens or a combination of several lens elements. In one embodiment, lens holder 482 and lens unit 481 are correspondingly threaded.

Solid state die 490 is disposed on lens unit 481 when FPC 400 is folded into shape 430 (see FIG. 4A). Opening 405 of FPC 400 is aligned with the active area of solid state die 490 and lens unit 481 when FPC 450 is folded into shape 430. Opening 405 allows light to reach image sensor 485 to form an image.

In this embodiment, image capture unit 480 is designed to include a number of alignment pins 425 extended from lens holder 482. As described above, FPC 400 includes corresponding holes 420 for alignment pins 425 to go through.

In this embodiment, a housing 470 is utilized in combination with substrate 450 to enclose lens unit 481, image sensor 485, solid state die 490, and FPC 400. Housing 470 includes opening 475 to allow light to be received by image sensor 485. Opening 475 may be covered by a transparent protector such as glass or plastic (not shown). The received light is focused by optical elements, which in this embodiment are solid state die 490 and lens unit 481, and form an image on image sensor 485. In another embodiment, lens unit 481 may not be included, and solid state die 490 is the only optical element to focus the received light.

In this embodiment, substrate 450 is longer than housing 470. Electrical connectors 460 electrically coupled to electric circuits on substrate 450 are disposed under the substrate. Connectors 460 may not be disposed in line with housing 470, as shown in this embodiment. Connectors 460 may be used to couple the image capture system of FIG. 4B to other system circuitry/modules (e.g., focusing circuitry to control the voltage or electrical signal received by solid state die 490).

In one embodiment, housing 470 includes a mechanical latch such that housing 470 is securely mounted on substrate 450. In other embodiments, an adhesive or sealant may be used to attach housing 470 to substrate 450 or to seal housing 470.

Figure 5:
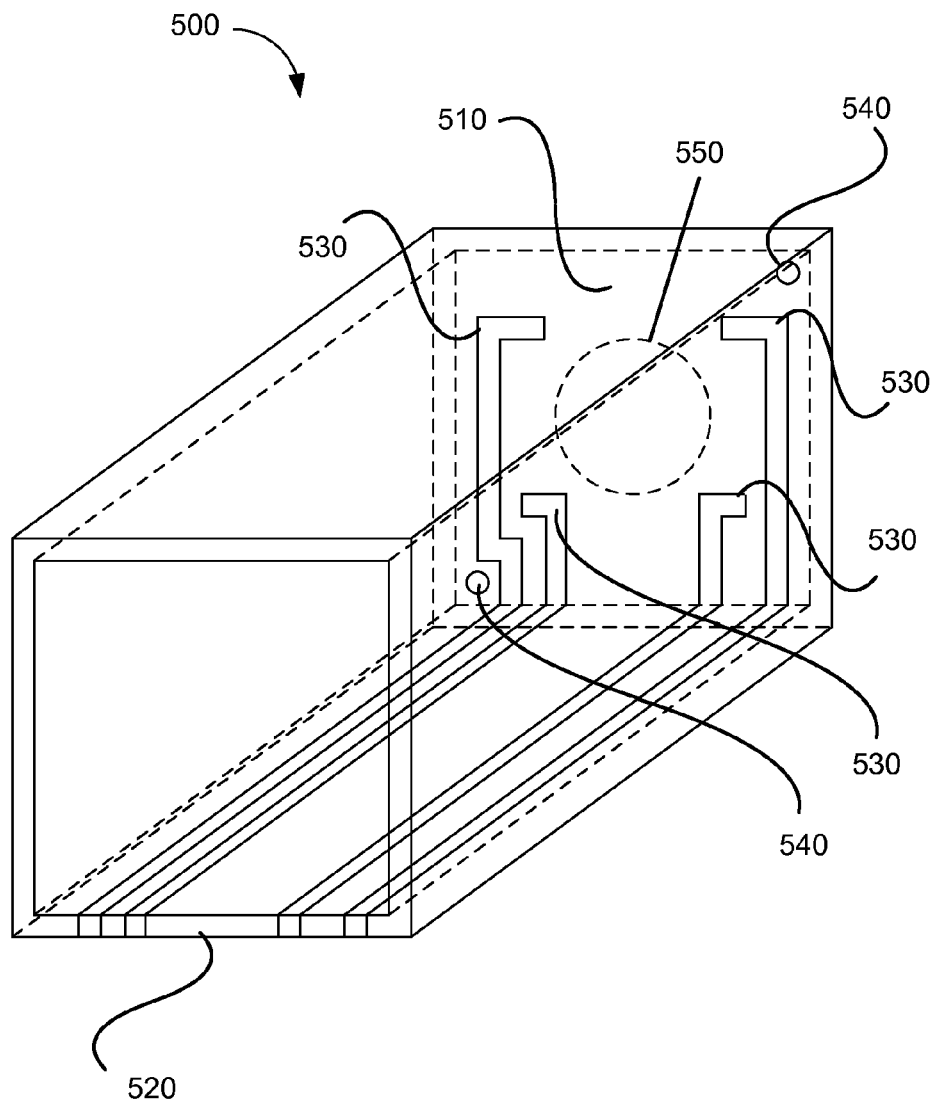
FIG. 5 is an illustration of a housing of an image capture system in accordance with an embodiment of the disclosure.

FIG. 5 is an illustration of a housing 500 of an image capture system in accordance with an embodiment of the disclosure. The embodiment is similar to the embodiment illustrated in FIG. 4B, except there is no FPC 400 between housing 470 and solid state die 490.

FIG. 5 illustrates electrodes 530 to be extended along the same inner wall of housing 500 to an edge 520 at bottom of the wall. Electrodes 530 may be on different walls and extended to different edges of housing 500. Electrodes 530 are conforming to electrodes of the solid state die.

Housing 500 is made of non-conductive materials. For example, housing 500 may be manufactured by molding. If housing 500 is made of conductive materials such as metal, proper isolation for electrodes is required.

The solid state die (not shown) is mounted to inner side 510 of the top of housing 500. A conductive adhesive may be provided at electrodes of the solid state die to attach these electrodes to the conforming electrodes 530 of housing 500, such that the solid state die is electrically coupled to the electric circuits on the substrate via electrodes 530, when housing 500 is properly disposed on the substrate. Edge 520 is properly pressed on the substrate such that the extensions of electrodes from housing 500 properly in electrical contact with their respective counterpart electrodes on the substrate.

In this embodiment, housing 500 is further designed to accommodate alignment pin bores 540 and opening 550 included on the top of housing 500, such that the alignment pins (i.e., pins 425 as illustrated in FIG. 4B) enter bores 540.

Figure 6:
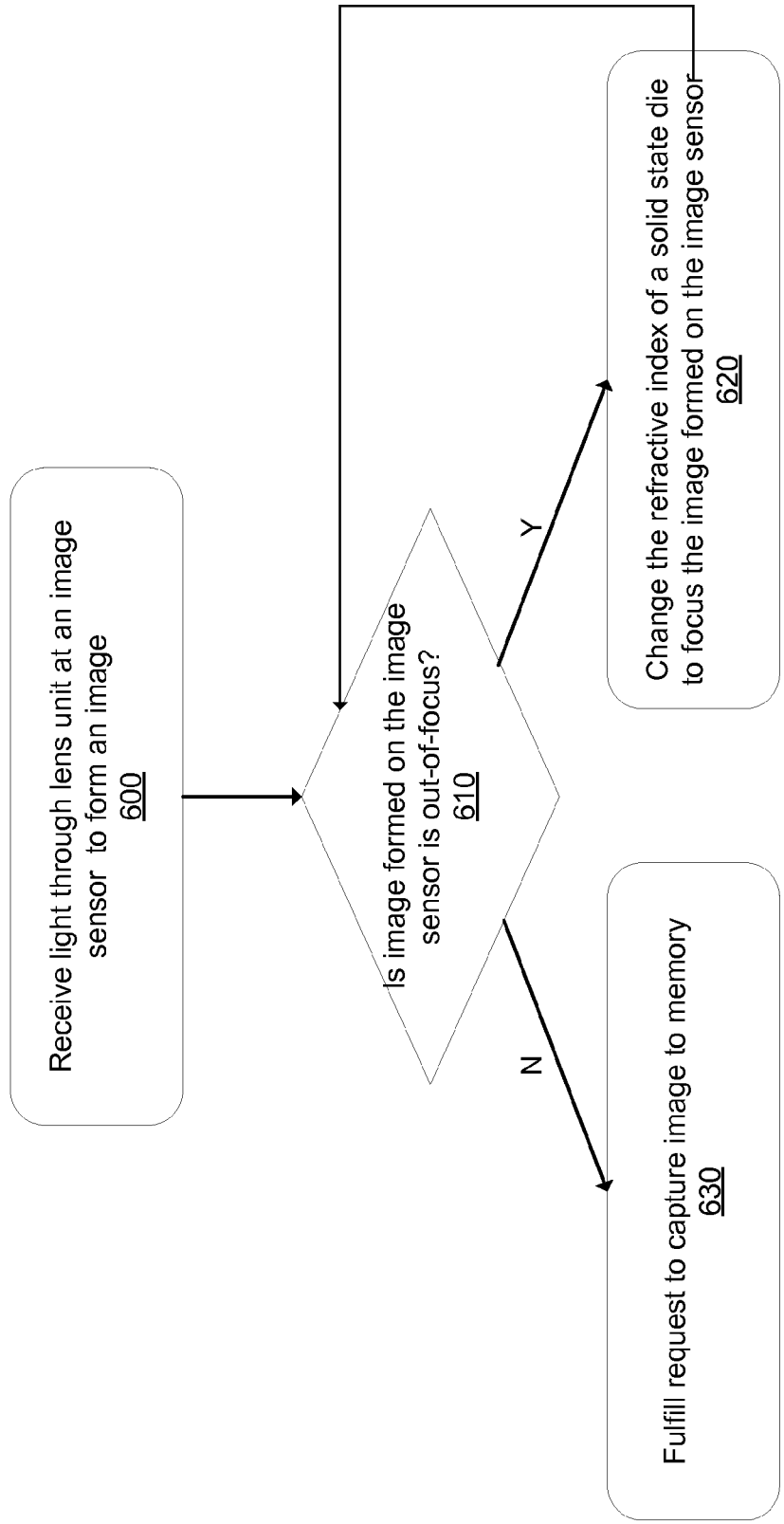
FIG. 6 is a flow diagram of a process in accordance with an embodiment of the disclosure.

FIG. 6 is a flow diagram of a process in accordance with an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Light through a lens unit is received at an image sensor and an image is formed on the image sensor, 600. A focus module or focus circuitry may determine whether the image formed on the image sensor is out-of-focus, 610. If it is determined that the image is out-of-focus, then the focus module/circuitry may execute operations to change an electric field at a solid state die disposed on the lens unit. This will change the refractive index of the solid state die to focus the image formed on the image sensor, 620. Once it is determined that the image is in-focus, requests to capture said image may be fulfilled, 630.

It is to be understood that the lens units, solid state dies and housings illustrated in the above described figures are square shaped as examples only, and that in other embodiments of the invention, other shapes may be utilized (e.g., rectangular, circular).

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable non-transitory storage medium may also include a storage or database from which content can be downloaded. Said machine readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An apparatus comprising:
 a substrate including electrical circuits;
 an image sensor disposed on the substrate;
 a lens unit disposed on the image sensor, the image sensor to receive light through the lens unit to form an image;
 a lens holder holding the lens unit, wherein the lens holder and the lens unit are correspondingly threaded;
 a solid state die disposed on the lens unit and operatively coupled to the electrical circuits of the substrate, the solid state die including a plurality of electrodes to receive a voltage from the electrical circuits of the substrate to generate an electric field, a refractive index of the solid state die to change based on the electric field to focus the image formed on the image sensor from light received through the lens unit; and a flexible printed circuit board (FPC) having a first end and a second end, wherein the solid state die is disposed on the first end of the FPC and the second end of the FPC is disposed on the substrate, and wherein the solid state die is to be disposed on the lens unit when the FPC is folded;

wherein the lens holder includes a plurality of alignment pins, wherein the first end of the FPC includes a plurality of holes conforming to the plurality of alignment pins of the lens holder, and wherein the plurality of alignment pins are inserted through the plurality of holes of the FPC when the FPC is folded into shape over the lens holder to hold the solid state die over the lens unit.

2. The apparatus of claim 1, wherein the FPC includes a plurality of electrodes conforming to the plurality of electrodes of the solid state die.

3. The apparatus of claim 2, wherein the plurality of electrodes of the solid state die are coupled to the plurality of conforming electrodes of the FPC.

4. The apparatus of claim 1, wherein the second end of the FPC is disposed on the substrate via an anisotropic conductive film (ACF).

5. The apparatus of claim 1, wherein the FPC includes an opening conforming to the lens unit.

6. The apparatus of claim 1 further comprising a housing to enclose the image sensor, the lens unit, the solid state die and the FPC.

7. The apparatus of claim 6, further comprising a mechanical latch to securely couple the housing to the substrate.

8. The apparatus of claim 1, wherein the solid state die comprises liquid crystal material.

9. The apparatus of claim 1, further comprising:
auto-focus circuitry coupled to the electrical circuits of the substrate to control the voltage received by the electrodes of the solid state die.

10. An apparatus comprising:
a substrate including electrical circuits;
an image sensor disposed on the substrate;
a lens unit disposed on the image sensor, the image sensor to receive light through the lens unit to form an image;
a lens holder holding the lens unit, wherein the lens holder and the lens unit are correspondingly threaded;
a solid state die disposed on the lens unit, the solid state die including a plurality of electrodes to receive a voltage from the electrical circuits to generate an electric field, a refractive index of the solid state die to change based on the electric field to focus the image formed on the image sensor from light received through the lens unit; and
a housing disposed on the substrate, wherein the solid state die is disposed on an inner side of the housing, the inner side of the housing including a plurality of electrodes to electrically couple the plurality of electrodes of the solid state die to the electrical circuits of the substrate;
wherein the lens holder includes a plurality of alignment pins, wherein the housing includes a plurality of bores conforming to the plurality of alignment pins of the lens holder, and wherein the plurality of alignment pins are to be inserted through the plurality of bores to hold the solid state die over the lens unit and the lens holder.

11. The apparatus of claim 10, wherein the plurality of electrodes of the solid state die are coupled to the plurality of electrodes of the housing.

12. The apparatus of claim 10, wherein the housing includes an opening conforming to the lens unit.

13. The apparatus of claim 10, further comprising a mechanical latch to securely couple the housing to the substrate.

14. The apparatus of claim 10, further comprising:
auto-focus circuitry coupled to the electrical circuits of the substrate to control the voltage received by the electrodes of the solid state die.

15. A system comprising:
a substrate including electrical circuits;
an operating unit coupled to the electrical circuits of the substrate;
an image capture subsystem, coupled to the electrical circuits of the substrate, including:
an image sensor disposed on the substrate,
a lens unit disposed on the image sensor, the image sensor to receive light through the lens unit to form an image,
a lens holder holding the lens unit, wherein the lens holder and the lens unit are correspondingly threaded,
a solid state die disposed on the lens unit and operatively coupled to the electrical circuits of the substrate, the solid state die including a plurality of electrodes to receive a voltage from the electrical circuits of the substrate to generate an electric field, a refractive index of the solid state die to change based on the electric field to focus the image formed on the image sensor from light received through the lens unit, and
a flexible printed circuit board (FPC) having a first end and a second end, wherein the solid state die is disposed on the first end of the FPC and the second end of the FPC is disposed on the substrate, and wherein the solid state die is to be disposed on the lens unit when the FPC is folded,
wherein the lens holder includes a plurality of alignment pins, wherein the first end of the FPC includes a plurality of holes conforming to the plurality of alignment pins of the lens holder, and wherein the plurality of alignment pins are inserted through the plurality of holes of the FPC when the FPC is folded into shape over the lens holder to hold the solid state die over the lens unit;
a controlling unit coupled to the electrical circuits of the substrate to control the image capture subsystem; and
readout circuitry coupled to the electrical circuits of the substrate to readout image data from the image sensor of the image capture subsystem.

16. The system of claim 15, wherein the system comprises a mobile phone and the operating unit comprises a telephone unit.

17. A system comprising:
a substrate including electrical circuits;
an operating unit coupled to the electrical circuits of the substrate;
an image capture subsystem, coupled to the electrical circuits of the substrate, including:
an image sensor disposed on the substrate,
a lens unit disposed on the image sensor, the image sensor to receive light through the lens unit to form an image,
a lens holder holding the lens unit, wherein the lens holder and the lens unit are correspondingly threaded,
a solid state die disposed on the lens unit and operatively coupled to the electrical circuits of the substrate, the solid state die including a plurality of electrodes to receive a voltage from the electrical circuits of the substrate to generate an electric field, a refractive index of the solid state die to change based on the electric field to focus the image formed on the image sensor from light received through the lens unit, and a housing disposed on the substrate, wherein the solid state die is disposed on an inner side of the housing, the inner side of the housing including a plurality of electrodes to electrically couple the plurality of electrodes of the solid state die to the electrical circuits of the substrate, wherein the lens holder includes a plurality of alignment pins, wherein the housing includes a plurality of bores conforming to the plurality of alignment pins of the lens holder, and wherein the plurality of alignment pins are to be inserted through the plurality of bores to hold the solid state die over the lens unit and the lens holder;

a controlling unit coupled to the electrical circuits of the substrate to control the image capture subsystem; and readout circuitry coupled to the electrical circuits of the substrate to readout image data from the image sensor of the image capture subsystem.

18. The system of claim 17, wherein the system comprises a mobile phone and the operating unit comprises a telephone unit.

* * * * *